US010572421B2

(12) United States Patent
Fong et al.

(10) Patent No.: US 10,572,421 B2
(45) Date of Patent: Feb. 25, 2020

(54) TOPOLOGY-AWARE PARALLEL REDUCTION IN AN ACCELERATOR (71) Applicant: International Business Machines Corporation, Armonk, NY (US)

(72) Inventors: Liana Liyow Fong, Irvington, NY (US); Wei Tan, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/235,059

(22) Filed: Dec. 28, 2018

(65) Prior Publication Data

US 2019/0138474 A1 May 9, 2019

Related U.S. Application Data (63) Continuation of application No. 14/953,114, filed on Nov. 27, 2015, now Pat. No. 10,169,275.

(51) Int. Cl.
*G06F 13/366* (2006.01)
*G06F 13/40* (2006.01)
*G06F 13/42* (2006.01)

(52) U.S. Cl.
CPC ........ *G06F 13/366* (2013.01); *G06F 13/4068* (2013.01); *G06F 13/4282* (2013.01)

(58) Field of Classification Search
CPC ..... G06F 13/4282; G06F 17/16; G06F 9/5027
See application file for complete search history.

(56) References Cited

U.S. PATENT DOCUMENTS

| 8,200,940 | B1 | 6/2012 | Lindholm |
| 8,321,492 | B1 | 11/2012 | Sengupta et al. |
| 8,332,460 | B2 | 12/2012 | Blocksome et al. |
| 8,760,455 | B2 | 6/2014 | Duluk, Jr. et al. |
| 9,152,462 | B2 | 10/2015 | Takano |
| 9,172,923 | B1 | 10/2015 | Prins et al. |
| 9,830,354 | B2 | 11/2017 | Asaad et al. |
| 10,203,988 | B2* | 2/2019 | Fong ..................... G06F 9/5061 |
| 2013/0148947 | A1 | 6/2013 | Glen et al. |
| 2014/0282584 | A1 | 9/2014 | Feind |
| 2015/0049094 | A1 | 2/2015 | Yan et al. |

(Continued)

OTHER PUBLICATIONS

"Electric Power Systems Research" An international journal devoted to research and new applications in generation, transmission, distribution and utilization of electric power, pp. 295-301, vol. 121; Apr. 2015, (Year: 2015).*

(Continued)

*Primary Examiner* — Brian T Misiura
(74) *Attorney, Agent, or Firm* — Anthony Curro, Esq.; McGinn IP Law Group, PLLC (57) ABSTRACT

A topology-aware parallel reduction method, system, and recording medium including obtaining the GPU connection topology of each of the plurality of GPUs as a connection tree, transforming the connection tree into a three layer tree comprising an intra-root tree, an intra-node tree, and an inter-node tree, evenly partitioning each entry on each of the GPUS, and selectively transferring data either in either direction or in each direction, simultaneously, along the evenly partitioned three layer tree using a full-duplex configuration of a PCIe bandwidth.

3 Claims, 8 Drawing Sheets

(56) References Cited

U.S. PATENT DOCUMENTS

| | | | |
|---|---|---|---|
| 2017/0032487 A1 | 2/2017 | Ashari et al. | |
| 2017/0083364 A1 | 3/2017 | Zhao et al. | |
| 2017/0116156 A1 | 4/2017 | Fong et al. | |
| 2017/0116157 A1 | 4/2017 | Fong et al. | |
| 2018/0276044 A1* | 9/2018 | Fong | G06F 9/5044 |
| 2018/0341856 A1* | 11/2018 | Kawachiya | G06N 3/063 |

OTHER PUBLICATIONS

United States Notice of Allowance dated Sep. 28, 2018, in U.S. Appl. No. 14/953,114.
United States Office Action dated Aug. 28, 2018, in U.S. Appl. No. 14/953,114.
United States Office Action dated May 1, 2018, in U.S. Appl. No. 14/953,114.
United States Office Action dated Dec. 14, 2018, in U.S. Appl. No. 14/953,114.
nVidia, "Optimizing Parallel Reduction in CUDA", by Mark Harris, 38 pages dated 2007.
Morales-Aguilar, E. et al.; "Multi-frequency sweeping method for periodic steady-state computations on the graphics processor unit", Electric Power Systems Research vol. 121, 2044.
Bakhoda, A. et al.; "Analyzing CUDA workloads using a detailed GPU simulator", IEEE International Symposium on Performance Analysis of Systems & Software,pp. 163-174,IEEE; 2009.
Cho, CS. et al.; "Low-Complexity Topological Derivative-Based Segmentation"; IEEE Transactions on Image Processing, vol. 24, No. 2, pp. 734-741, Feb. 2015.
Humphreys, G.; "GPU Accelerated Rasterization", An IP.com Prior Art Database Technical Disclosure; http://ip.com/IPCOM/000239215, Oct. 21, 2014.
Adhikari, S. et al.; "Parallel Database Indexing using GPU Hardware"; An IP.com Prior Art Database Technical Disclosure; http://ip.com/IPCOM/000176548, 2014.

* cited by examiner

TOPOLOGY-AWARE PARALLEL REDUCTION IN AN ACCELERATOR

CROSS-REFERENCE TO RELATED APPLICATIONS

The present application is a Continuation Application of U.S. patent application Ser. No. 14/953,114, filed on Nov. 27, 2015, the entire contents of which are hereby incorporated by reference.

BACKGROUND

The present invention relates generally to communication among accelerators, and more particularly, but not by way of limitation, to a system, a method, and a recording medium for topology-aware parallel reduction in an accelerator.

How to efficiently communicate among multiple accelerators that are used in several industries.

Conventional techniques merely map a unit of work to each accelerator to work independently, and then reduce or summarize the results from the map phase. However, in the reduction phase, since accelerators are generally very fast, the accelerators are largely idle in the reduction phase waiting for data to arrive, which creates a waste of the expensive and powerful computing capacity.

That is, conventional techniques for the synchronization of accelerators are not optimized in that they are not parallelized, such that the reduce task on one accelerator has to wait for tasks from other accelerators to complete and transfer data. Also, the accelerators do not efficiently leverage the full-duplex PCIe bandwidth since multiple accelerations on a machine are usually connected through a PCIe bus. PCIe (Peripheral Component Interconnect Express) bus is a communication bus to connect devices such as I/O devices, and accelerators including GPUs. The PCIe channels are full-duplex and the conventional techniques merely transfer data in one direction and further increase the wait time. An accelerator is a hardware device designed to improve the performance of certain computational operations. Examples include graphics processing units (GPUs) which do graphics processing faster than GPUs; a field-programmable gate array (FPGA) that is to speed up certain computation intensive tasks. Reduce, or reduction is a type of operation that summarizes the results from a map phase in which operations are performed in parallel by multiple workers on computing nodes. Examples of reduce operations include summation, group, and sorting.

Accelerators can be connected to computing node via PCIe devices. If multiple ac accelerators are connected to a single Me, we use the term "intra-root" if the accelerators communicate with among them. The term "intra-node" is used for communication between accelerators if they are not on the same PCIe but on the same machine or computing node. The term "inter-node" is used for communication between accelerators on different machines.

Thus, the present inventors have recognized that, the above conventional systems, and other conventional accelerator systems, are limited in their applications in that they utilize only one direction of the full-duplex PCIe boards and the accelerators are not parallelized in any manner that reduces waste of computer resources due to idling of faster components.

SUMMARY

In an exemplary embodiment, the present invention can provide a topology-aware parallel reduction system, including a partitioning device configured to partition data in each accelerator of a plurality of accelerators into partitions based on a topology of connections between the plurality of accelerators and a control device configured to control, based on a topology of connections between the plurality of accelerators, a type of parallel reduction of data to use.

Further, in another exemplary embodiment, the present invention can provide a topology-aware parallel reduction method, including partitioning data in each accelerator of the plurality of accelerators into a number of partitions equal to a number of the plurality of accelerators on a single machine based on a topology of connections between the plurality of accelerators and controlling, based on a topology of connections between the plurality of accelerators, a type of parallel reduction of data to use.

Even further, in another exemplary embodiment, the present invention can provide a non-transitory computer-readable recording medium recording a topology-aware parallel reduction program, the program causing a computer to perform: partitioning data in each accelerator of the plurality of accelerators into a number of partitions equal to a number of the plurality of accelerators on a single machine based on a topology of connections between the plurality of accelerators and controlling, based on a topology of connections between the plurality of accelerators, a type of parallel reduction of data to use.

There has thus been outlined, rather broadly, exemplary embodiments of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
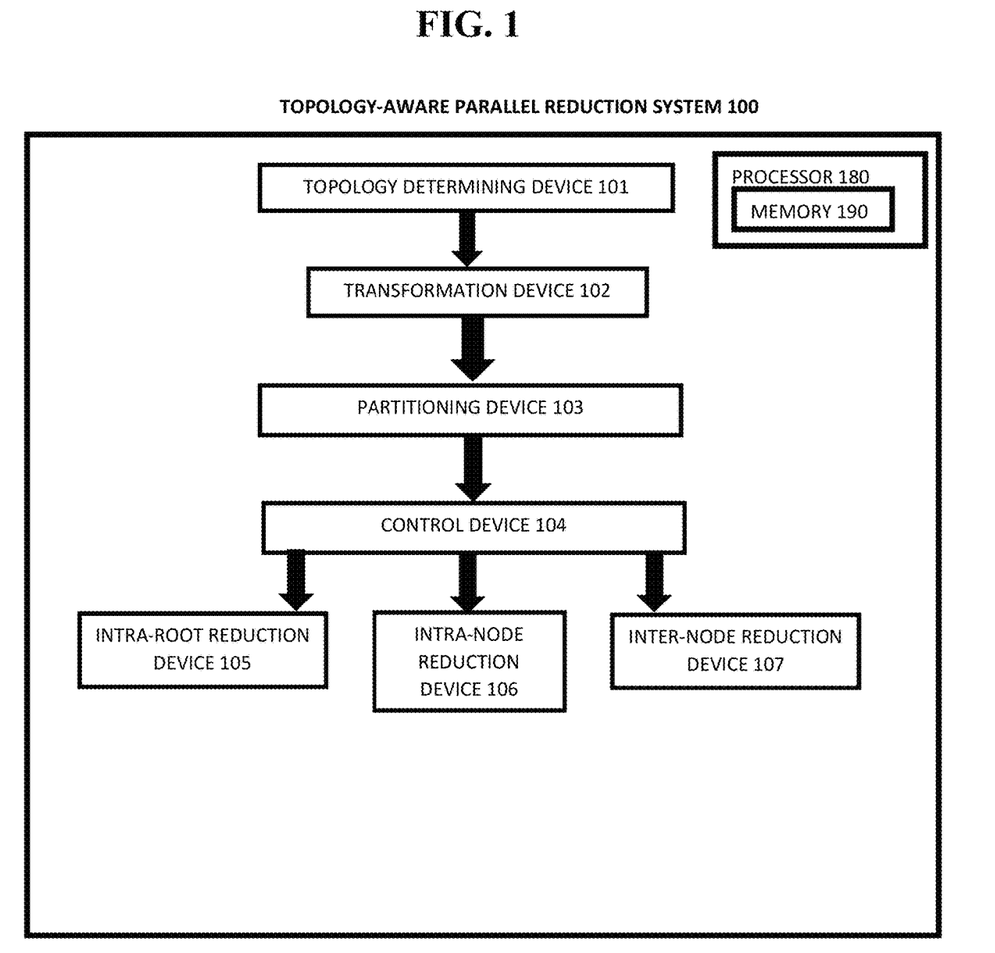
FIG. 1 exemplarily shows a block diagram illustrating a configuration of a topology-aware parallel reduction system 100.

With reference now to FIG. 1, the topology-aware parallel reduction system 100 includes a topology determining device 101, a transformation device 102, a partitioning device 103, a control device 104, an intra-root reduction device 105, an intra-node reduction device 106, and an inter-node reduction device 107. The topology-aware parallel reduction system 100 includes a processor 180 and a memory 190, with the memory 190 storing instructions to cause the processor 180 to execute each device of the topology-aware parallel reduction system 100.

It should be noted that the term Graphical Processing Unit (GPU) is used in exemplary illustrations of the invention as a specific type of accelerator, however, the invention it not limited thereto. That is, the disclosure and parallel reduction can be used for any type of accelerator.

Figure 6:
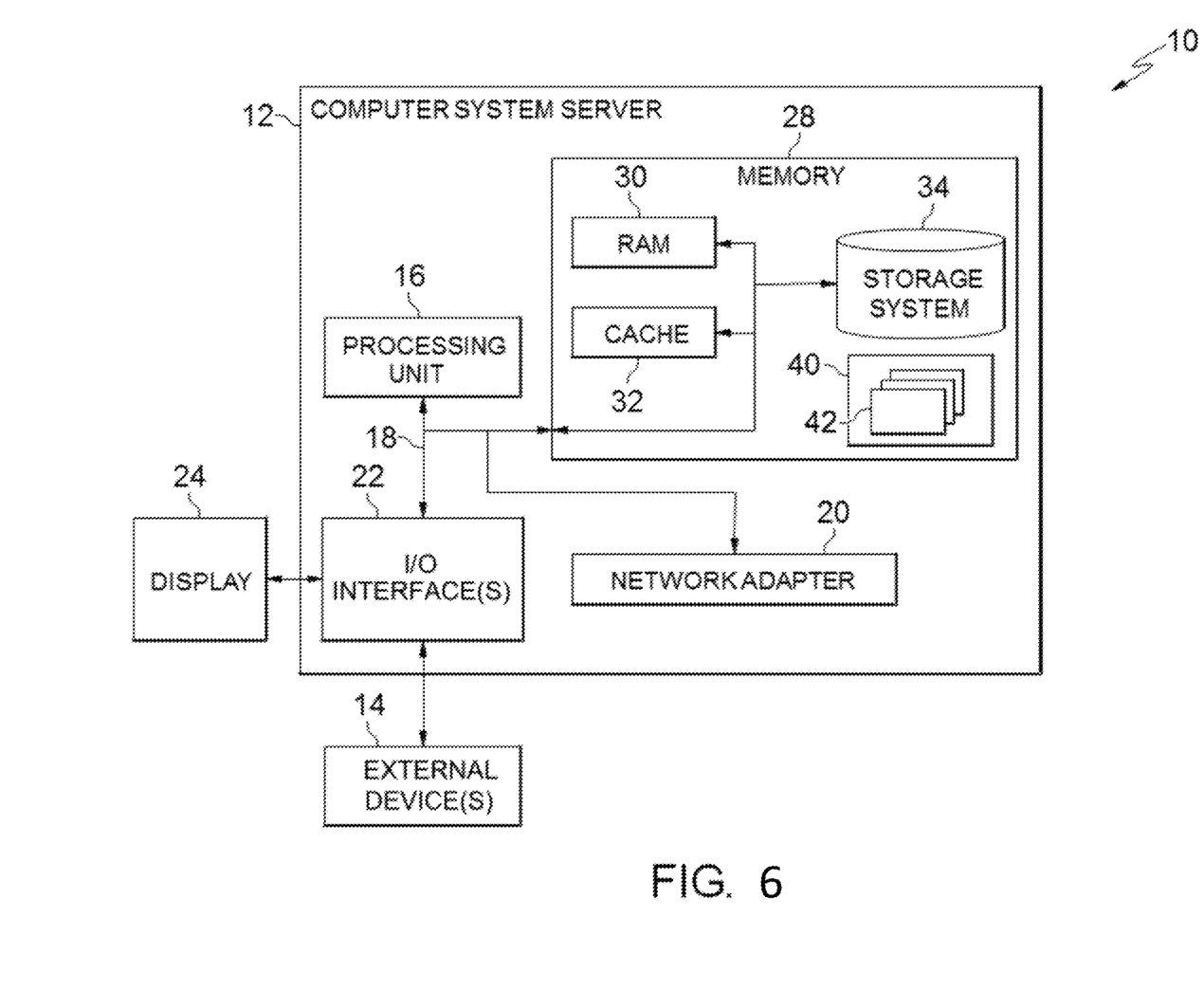
FIG. 6 depicts a cloud computing node according to an embodiment of the present invention.
Figure 7:
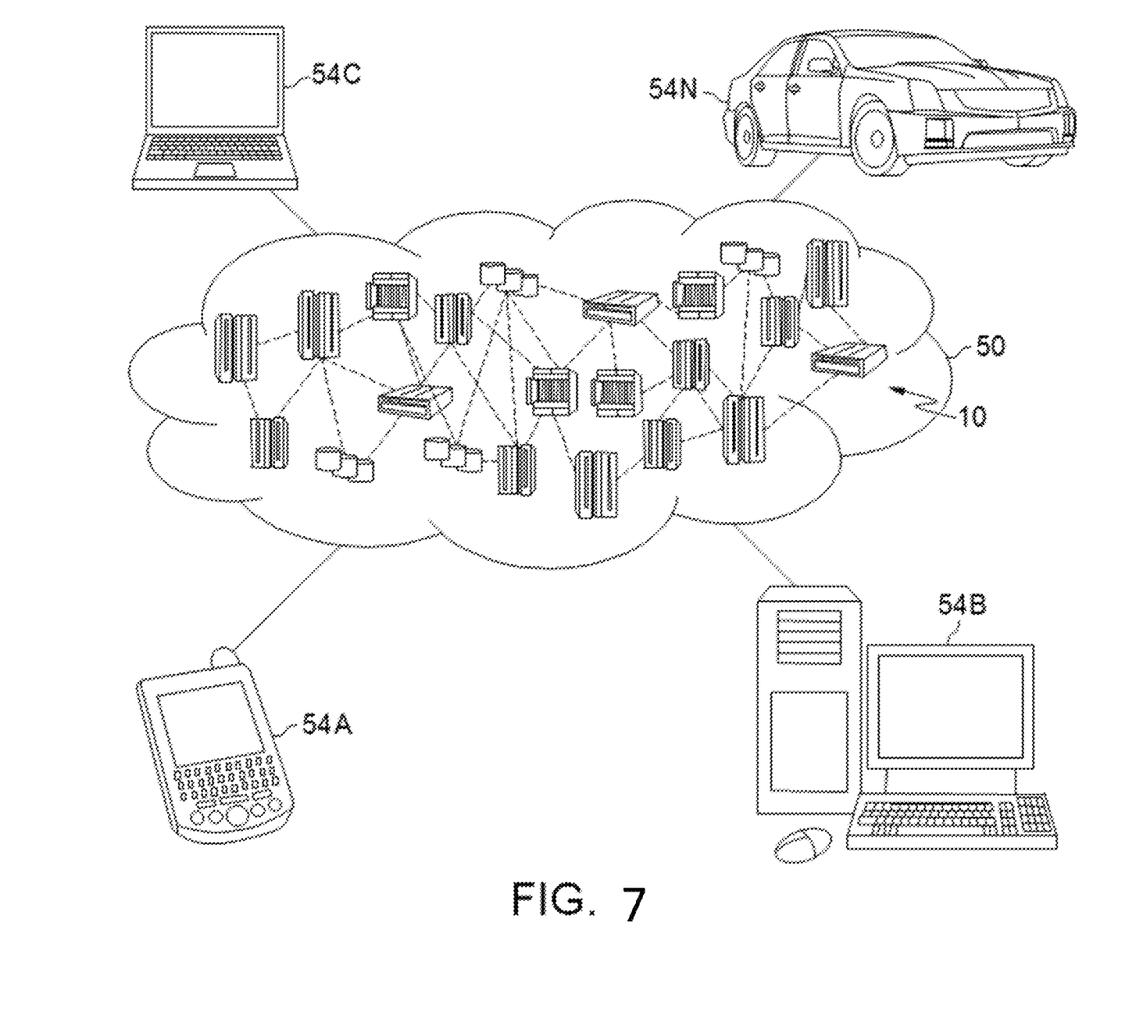
FIG. 7 depicts a cloud computing environment according to another embodiment of the present invention.
Figure 8:
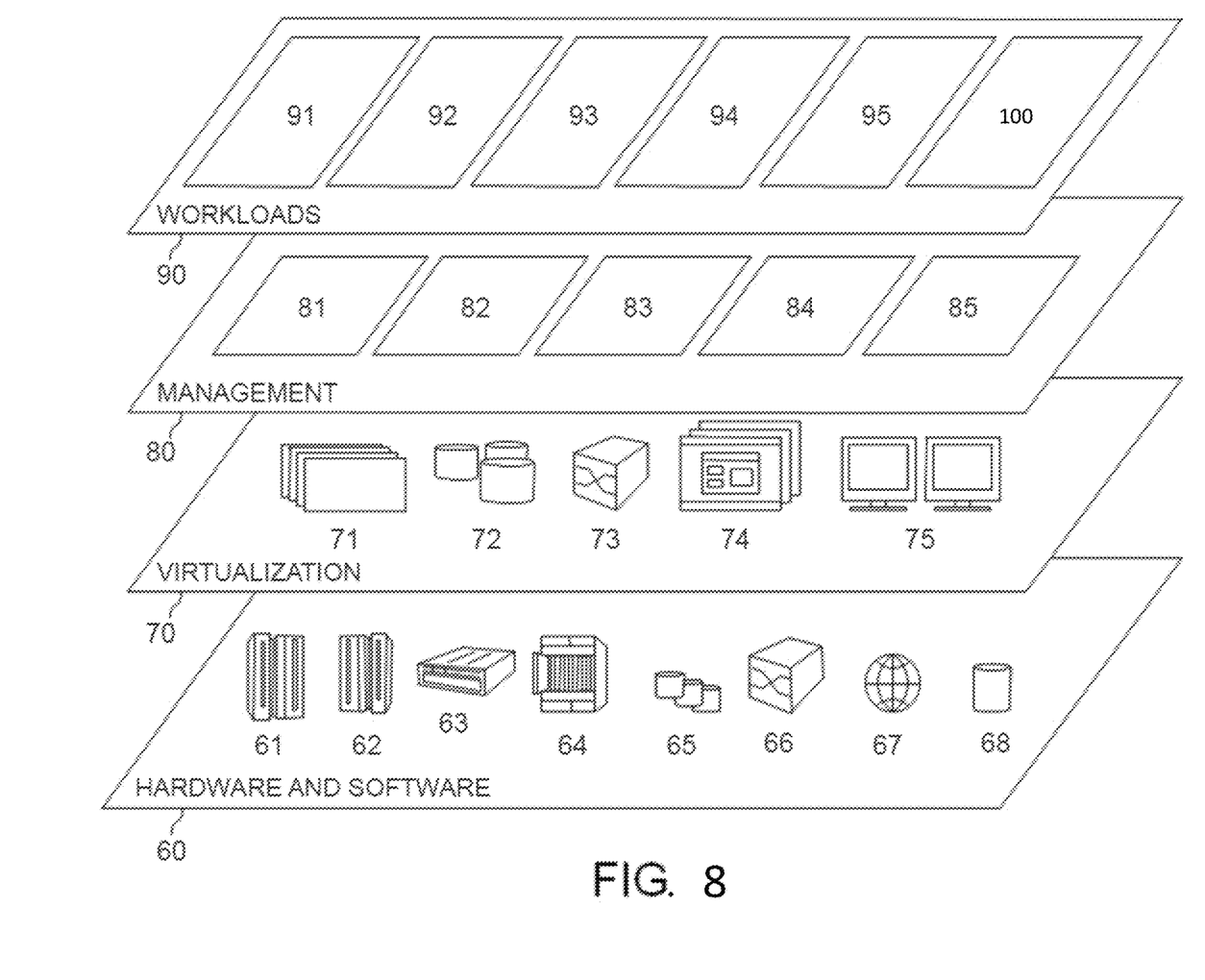
FIG. 8 depicts abstraction model layers according to an embodiment of the present invention.

Although as shown in FIGS. 6-8 and as described later, the computer system/server 12 is exemplarily shown in cloud computing node 10 as a general-purpose computing device which may execute in a layer the topology-aware parallel reduction systems 100 (FIG. 8), it is noted that the present invention can be implemented outside of the cloud environment.

Figure 4:
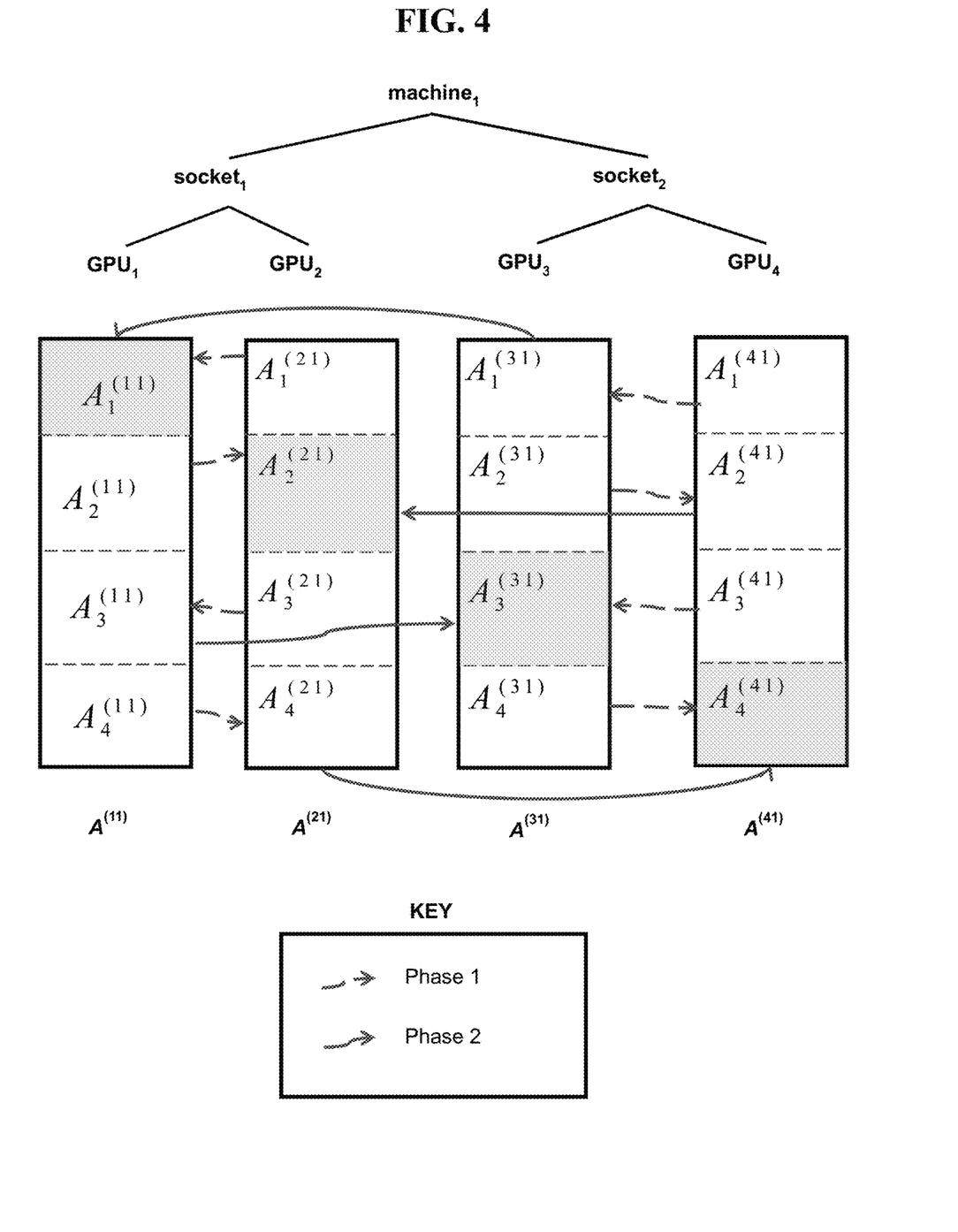
FIG. 4 exemplarily shows an intra-node reduction with topology-aware scheme
Figure 5:
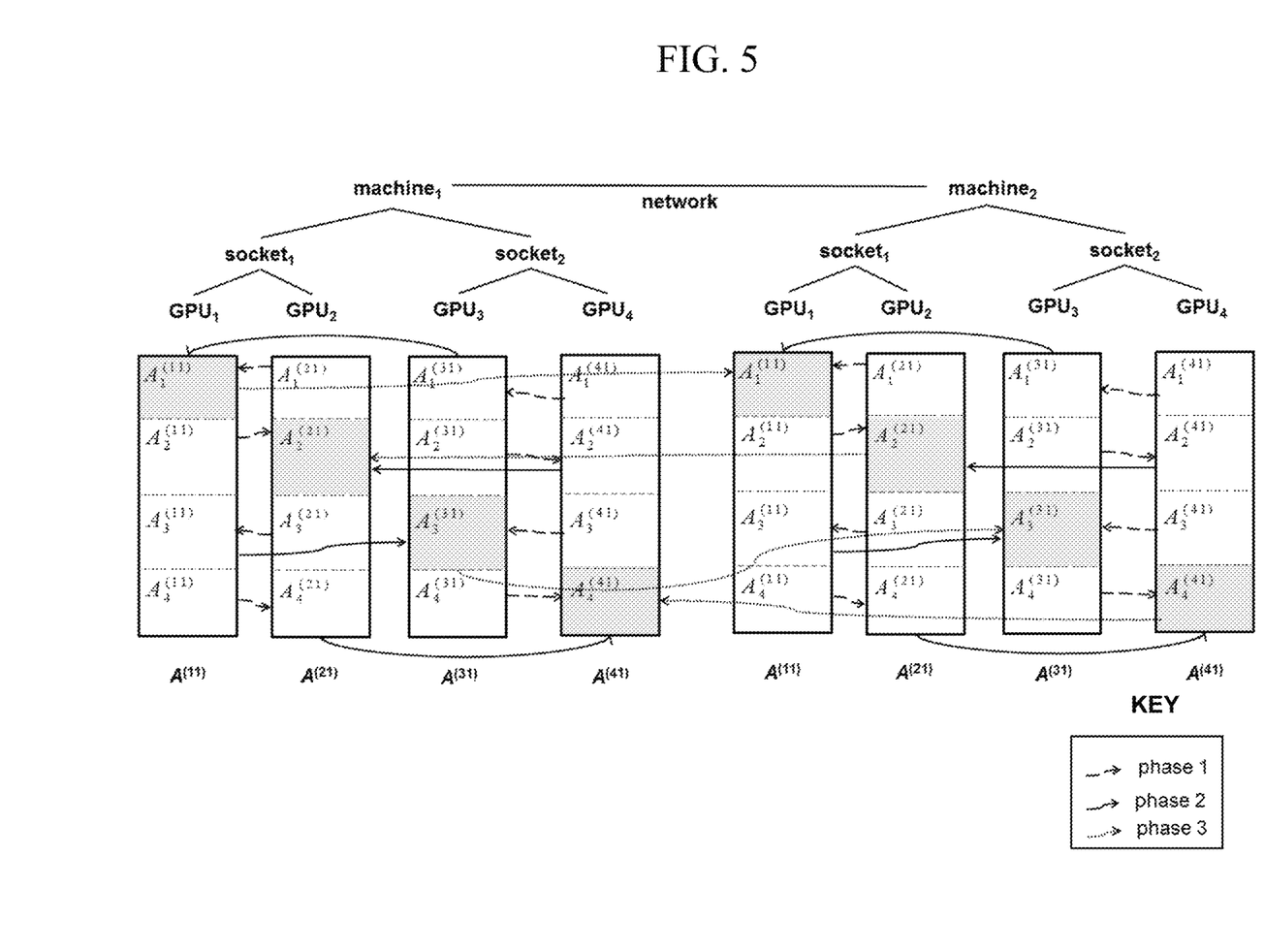
FIG. 5 exemplarily shows an inter-node reduction with topology-aware scheme.

Further, the disclosure relates to a plurality of GPUs being connected to each other either via a PCIe root (e.g., see FIG. 3), via a socket and inter-socket connection (e.g., see FIG. 4), or on a plurality of machines and connected through a network connection node (e.g., see FIG. 5). However, the disclosure is not limited to the three exemplary configured and can be applied to any type of connections between a plurality of accelerators.

The topology determining device 101 determines the topology of the connections between the GPUs. The topology determining device 101 can determine the topology based on a user input from, for example, an admin of a system or from a Linux command prompt reading the connections between the GPUs. Further, the topology determining device 101 determines the connection topology of the GPUs as a tree (e.g., as exemplarily shown in FIGS. 3-5).

Figure 3:
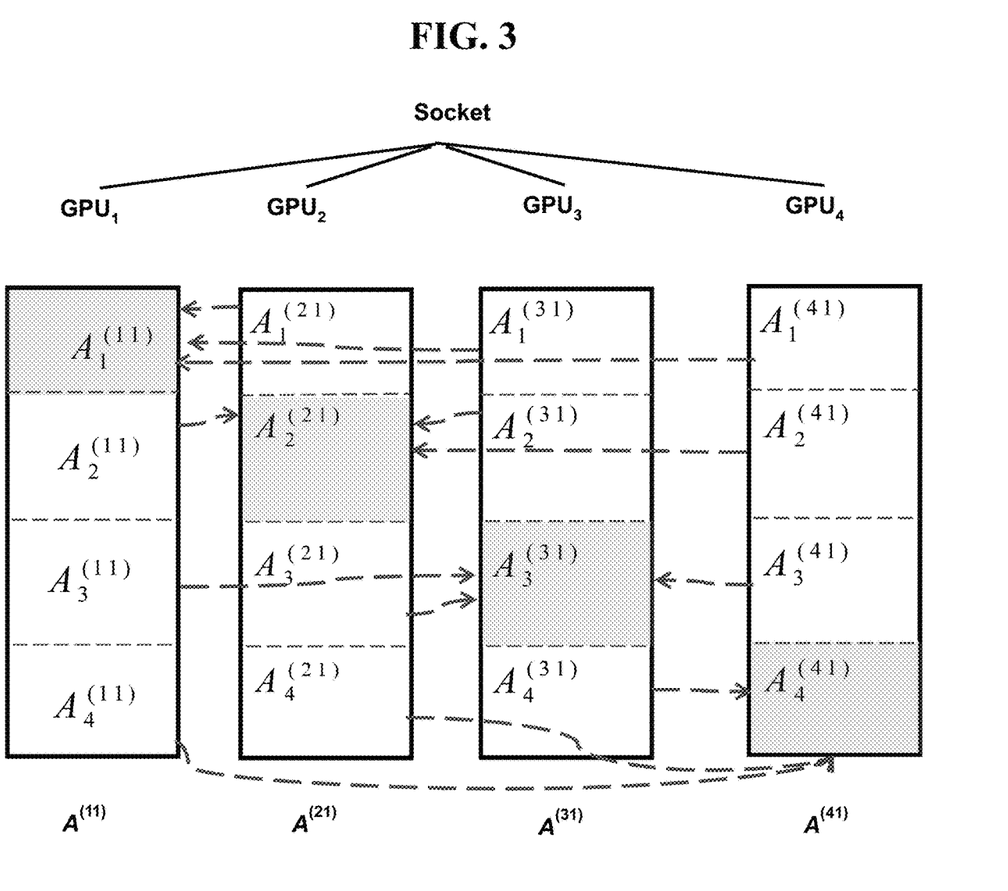
FIG. 3 exemplarily shows an intra-root reduction with topology-aware scheme.

For example, the topology determining device 101 can determine that one of the machines includes a single socket and has a plurality of GPUs connected via a PCIe bus as shown in FIG. 3, that the machine includes a plurality of sockets, each of which include a plurality of GPUs, and the sockets are connected via a socket node as shown in FIG. 4, or that the system includes a plurality of machines, each machine having a plurality of GPUs, the machines being connected via a network node as shown in FIG. 5. The present invention recognizes that there are different time delays for these different topologies with the PCIe bus having the shortest intercommunication time and the network having the longest.

The number of GPUs connected to each other is generally in multiples of two to increase efficiency of the GPU connections.

The transformation device 102 transforms a GPU connection topology with, for example, a PCIe extension to have a single connection point such that the GPUs are represented as a tree having one connection point.

The partitioning device 103 partitions the data to be reduced in each GPU into a number of partitions equal to the number of GPUs per machine. For example, as exemplarily shown in FIG. 3, there are four GPUs in the machine and thus the data in each GPU is partitioned by the partitioning device 103 into four partitions. And, as exemplary shown in FIG. 5, although there are eight GPUs connected in the network, each GPU in machine$_1$ is partitioned by the partitioning device 103 into four partitions since there are four GPUs in the machine$_1$ and each GPU in machine$_2$ is partitioned by the partitioning device 103 into four partitions since there are four GPUs in the machine$_2$.

Based on the topology determined by the topology determining device 101, the control device 104 controls the topology-aware parallel reduction system 100 to utilize one of the intra-root reduction device 105, the intra-node reduction device 106, and the inter-node reduction device 107 to decrease the time spent during the reduction of data.

More specifically, if the topology determining device 101 determines that the topology is a single PCIe root on a single machine, the control device 104 controls the system 100 to use the intra-root reduction device 105. If the topology determining device 101 determines that the topology is a machine with a multi-socket connected to an inter-socket node, the control device 104 controls the system 100 to use the intra-node reduction device 106. And, if the topology determining device 101 determines that the topology is a network connecting multiple machines, the control device 104 controls the system 100 to use inter-node reduction device 107.

The intra-root reduction device 105 uses the full-duplex configuration of the PCIe bandwidth when available, such that each GPU of the plurality of connected GPU can transfer data in each direction simultaneously without affecting the other GPUs of the plurality of GPUs.

As shown in FIG. 3, during intra-root reduction processing, the data in each GPU is partitioned into four partitions by the partitioning device 103 since there are four GPUs on the machine. $GPU_1$ is assigned to synchronize data for the first partitions, $GPU_2$ is assigned to synchronize data for the second partitions, $GPU_3$ is assigned to synchronize data for the third partitions, and $GPU_4$ is assigned to synchronize data for the fourth partitions.

Each GPU receives all of the data of the other GPUs for a particular partition such that data is synchronized quickly. That is, the intra-root reduction device 105 causes GPUs $A^{(21)}$, $A^{(31)}$, and $A^{(41)}$ to transfer partitions $A_1^{(21)}$, $A_1^{(31)}$, and $A_1^{(41)}$ to the first partition $A_1^{(11)}$ of the first GPU $A^{(11)}$. Also, the intra-root reduction device 105 causes GPU $A^{(11)}$, $A^{(31)}$, and $A^{(41)}$ to transfer partitions $A_2^{(11)}$, $A_2^{(31)}$, and $A_2^{(41)}$ to partition $A_2^{(21)}$ of the second GPU $A^{(21)}$. In this manner, as the data is continuously synchronized by intra-root reduction device 105 for the parallel GPUs $A^{(11)}$, $A^{(21)}$, $A^{(31)}$, and $A^{(41)}$, each GPU only stores data for one partition and synchronizes the data to the other GPUs until the process is done and then synchronizes all of the data together.

Moreover, the intra-node reduction device 105 uses the full-duplex configuration of the PCIe bandwidth such that each GPU of the plurality of connected GPU can transfer data in each direction simultaneously without affecting the other GPUs of the plurality of GPUs. However, the intra-node reduction device 106 is determined to be used by the control device 105 only when there are multiple sockets on a single machine, each socket including a plurality of GPUs.

As shown in FIG. 4, the intra-node processing is used when the exemplary machine includes socket having $GPU_1$ (i.e., GPU $A(^{11})$) and $GPU_2$ (i.e., GPU $A(^{21})$) and $socket_2$ having $GPU_3$ (i.e., GPU $A(^{31})$) and $GPU_4$ (i.e., GPU $A(^{41})$). Each GPU is partitioned into four partitions by the partitioning device 103 since there are four GPUs on the machine. $GPU_1$ is assigned to synchronize data for the first partitions, $GPU_2$ is assigned to synchronize data for the second partitions, $GPU_3$ is assigned to synchronize data for the third partitions, and $GPU_4$ is assigned to synchronize data for the fourth partitions. Differing from the intra-root reduction in the intra-root reduction device 105, the intra-node reduction by the intra-node reduction device 106 performs the intra-node reduction in a first phase and a second phase, as indicated by the KEY in FIG. 4.

During the first phase of the intra-node reduction, data is transferred between particular partitions of GPU and $GPU_2$ of $socket_1$ and $GPU_3$ and $GPU_4$ of $socket_2$. That is, the first phase of the intra-node reduction device 105 causes GPU $A^{(11)}$ to transfer the partitions $A_2^{(11)}$ and $A_4^{(11)}$ to partitions $A_2^{(21)}$ and $A_4^{(21)}$ of $A^{(21)}$. Similarly, GPU $A^{(21)}$ to transfer the partitions $A_1^{(21)}$ and $A_3^{(21)}$ to partitions $A_1^{(11)}$ and $A_3^{(11)}$ of $A^{(11)}$.

The intra-node reduction device 106 transfers data between sockets during the second phase. As shown in FIG. 4, since $GPU_3$ is synchronizing the data for the third partitions of all of the GPUs, the intra-node reduction device 106 causes the partition $A_3^{(11)}$ that includes the data for partition $A_3^{(11)}$ and $A_3^{(21)}$ to the partition $A_3^{(31)}$ of $GPU_3$. Similarly, since $GPU_4$ is synchronizing the data for the fourth partitions of all of the GPUs, the intra-node reduction device 106 causes the partition $A_4^{(21)}$ that includes the data for partition $A_4^{(11)}$ and $A_4^{(21)}$ to the partition $A_4^{(41)}$ of $GPU_4$.

That is, there is only a single transfer between sockets of the machine for each partition using the intra-node reduction device 106 so as to reduce the time taken to synchronize the data.

As shown in FIG. 5, inter-node processing is used when the exemplary network includes $machine_1$ including $socket_1$ having $GPU_1$ (i.e., GPU $A(^{11})$) and $GPU_2$ (i.e., GPU $A(^{21})$) and $socket_2$ having $GPU_3$ (i.e., GPU $A(^{31})$) and $GPU_4$ (i.e., GPU $A(^{41})$) and $machine_2$ including $socket_1$ having $GPU_1$ (i.e., GPU $A(^{11})$) and $GPU_2$ (i.e., GPU $A(^{21})$) and $socket_2$ having $GPU_3$ (i.e., GPU $A(^{31})$) and $GPU_4$ (i.e., GPU $A(^{41})$). Each GPU is partitioned into four partitions by the partitioning device 103 since there are four GPUs on each of $machine_1$ and $machine_2$.

For $machine_1$, $GPU_1$ is assigned to synchronize data for the first partitions, $GPU_2$ is assigned to synchronize data for the second partitions, $GPU_3$ is assigned to synchronize data for the third partitions, and $GPU_4$ is assigned to synchronize data for the fourth partitions. Differing from the intra-node reduction by the intra-node reduction device 106, the inter-node reduction by the inter-node reduction device 107 performs the inter-node reduction in a first phase, a second phase, and a third phase as shown by the KEY and the arrows in FIG. 5.

During the first phase of the inter-node reduction, data is transferred between particular partitions of $GPU_1$ and $GPU_2$ of $socket_1$ and $GPU_3$ and $GPU_1$ of $socket_2$ for each machine. That is, the first phase of the inter-node reduction device 106 causes GPU $A^{(11)}$ to transfer the partitions $A_2^{(11)}$ and $A_4^{(11)}$ to partitions $A_2^{(11)}$ and $A_4^{(21)}$ of $A^{(21)}$. Similarly, GPU $A^{(21)}$ to transfer the partitions $A_1^{(21)}$ and $A_3^{(21)}$ to partitions $A_1^{(11)}$ and $A_3^{(11)}$ of $A^{(11)}$ for each machine $machine_1$ and $machine_2$.

The inter-node reduction device 107 transfers data between sockets during the second phase. As shown in FIG. 5, since $GPU_3$ is synchronizing the data for the third partitions of all of the GPUs on machine, the inter-node reduction device 107 causes the partition $A_3^{(11)}$ that includes the data for partition $A_3^{(11)}$ and $A_3^{(21)}$ to the partition $A_3^{(31)}$ of $GPU_3$. Similarly, since $GPU_4$ is synchronizing the data for the fourth partitions of all of the GPUs on $machine_1$, the inter-node reduction device 107 causes the partition $A_4^{(21)}$ that includes the data for partition $A_4^{(11)}$ and $A_4^{(21)}$ to the partition $A_4^{(41)}$ of $GPU_4$.

That is, there is only a single transfer between sockets of the machine for each partition using the inter-node reduction device 107 so as to reduce the time taken to synchronize the data.

During phase 3, the inter-node reduction device 107 causes $machine_1$ and $machine_2$ of the network to transfer the data to synchronize the data of a partition onto one machine. For example, the first partition of $GPU_1$ of $machine_2$ receives the data from the first partition of $GPU_1$ of $machine_1$ and the second partition of $GPU_2$ of $machine_1$ receives the data from the second partition of $GPU_2$ of $machine_2$. In this manner, each GPU of the network is sending data in a particular direction to maximize the utility of the interconnection bandwidth.

Figure 2:
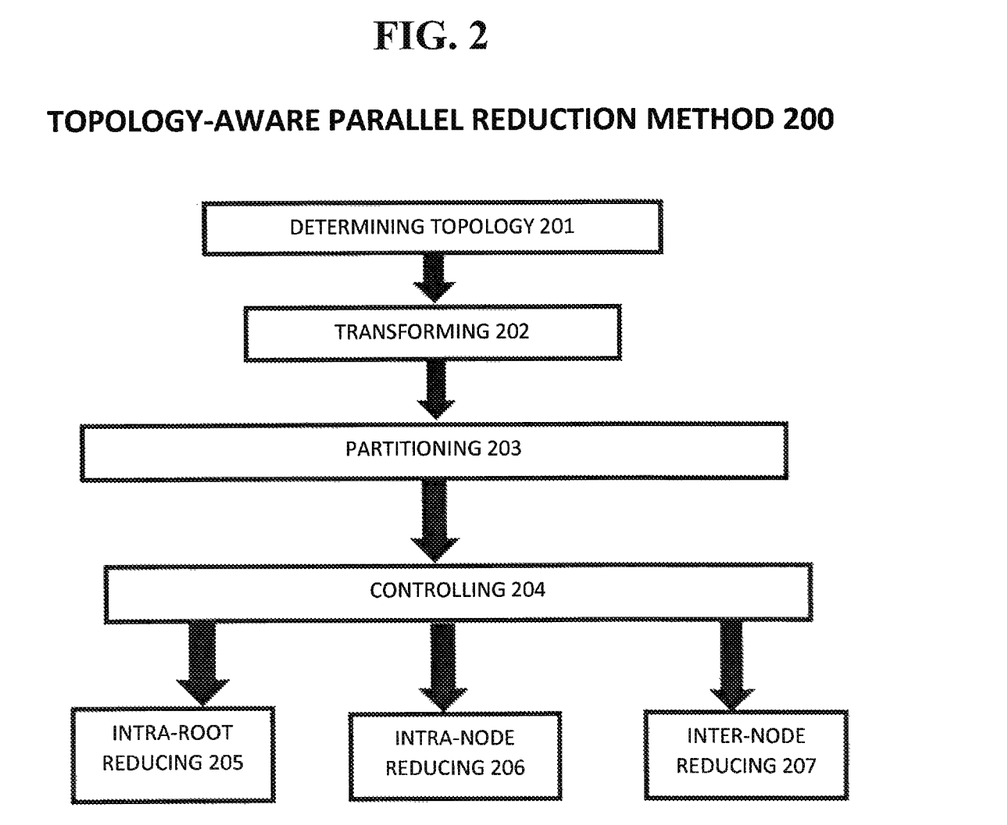
FIG. 2 exemplarily shows a high level flow chart for a topology-aware parallel reduction method 200.

FIG. 2 shows a high level flow chart for a topology-aware parallel reduction method 200.

Step 201 determines the topology of the connections between the GPUs. In some exemplary embodiments, this step is not necessary. Thus, if the invention is implemented in a known topology there is no need for a separate step to determine the topology.

Step 202 transforms a GPU connection topology with, for example, a PCIe extension to have a single connection point such that the GPUs are represented as a tree having one connection point.

Step 203 partitions the data in each GPU into a number of partitions equal to the number of GPUs per machine.

Based on the topology determined by the determining topology of Step 201, step 204 controls the topology-aware parallel reduction method 200 to utilize one of the intra-root reduction 205, the intra-node reduction 206, and the inter-node reduction 207 to decrease the time spent during the reduction of data.

Step 205 uses intra-root reduction by using the full-duplex configuration of the PCIe bandwidth such that each GPU of the plurality of connected GPU can transfer data in each direction simultaneously without affecting the other GPUs of the plurality of GPUs when step 205 determines that the GPUs are a single socket.

Step 206 uses the intra-node reduction 206 when step 204 determines there are multiple sockets on a single machine, each socket including a plurality of GPUs.

Step 207 uses the inter-node reduction when step 204 determines there are multiple sockets on a plurality of machines in a network.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the topology-aware parallel reduction 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

In view of the foregoing and other problems, disadvantages, and drawbacks of the aforementioned conventional techniques, it is desirable to provide a new and improved topology-aware parallel reduction system, method, and non-transitory recording medium that, enables more efficient synchronization time by utilizing the entire configuration (i.e., paralleling and full-duplex PCIe bandwidth) of the GPU systems.

What is claimed is:

1. A topology-aware parallel reduction system for parallel reduction of data on a plurality of graphical processing units (GPUs) in accordance with a GPU connection topology, the system comprising:
   a processor; and
   a memory, the memory storing instructions to cause the processor to perform:
   determining the GPU connection topology of each of the plurality of GPUs as a connection tree;
   transforming the connection tree into one of an intra-root tree, an intra-node tree, and an inter-node tree;
   evenly partitioning the data on each of the GPUs; and
   selectively transferring data either in either direction or in each direction, simultaneously, along the evenly partitioned tree using a full-duplex configuration of a PCIe bandwidth.

2. A topology-aware parallel reduction method for parallel reduction of data on a plurality of graphical processing units (GPUs) in accordance with a GPU connection topology, the method comprising:
   determining the CPU connection topology of each of the plurality of GPUs as a connection tree;
   transforming the connection tree into one of an intra-root tree, an intra-node tree, and an inter-node tree;
   evenly partitioning the data on each of the GPUs; and
   selectively transferring data either in either direction or in each direction, simultaneously, along the evenly partitioned tree using a full-duplex configuration of a PCIe bandwidth.

3. A non-transitory computer-readable recording medium recording a topology-aware parallel reduction program for parallel reduction of data on a plurality of graphical processing units (CPUs) in accordance with a CPU connection topology, the program causing a computer to perform:
   determining the GPU connection topology of each of the plurality of GPUs as a connection tree;
   transforming the connection tree into one of an intra-root tree, an intra-node tree, and an inter-node tree;
   evenly partitioning the data on each of the GPUs; and
   selectively transferring data either in either direction or in each direction, simultaneously, along the evenly partitioned tree using a full-duplex configuration of a PCIe bandwidth.

* * * * *